US006501471B1

(12) United States Patent
Venkataraman et al.

(10) Patent No.: US 6,501,471 B1
(45) Date of Patent: Dec. 31, 2002

(54) VOLUME RENDERING

(75) Inventors: Kartik Venkataraman, San Jose, CA (US); Tim Poston, Singapore (SG)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/453,852

(22) Filed: Dec. 13, 1999

(51) Int. Cl.[7] .............................................. G06T 15/00
(52) U.S. Cl. ...................................................... 345/424
(58) Field of Search ................................. 345/419, 420, 345/422, 424, 619, 629, 441

(56) References Cited

U.S. PATENT DOCUMENTS 5,949,424 A * 9/1999 Cabral et al. ............... 345/426

OTHER PUBLICATIONS

Thomas Porter, et al., Compositing Digital Images, Computer Graphics, vol. 18, No. 3, 253–258 (Jul. 1984).
Marc Levoy, Display of Surfaces from Volume Data, IEEE Computer Graphics & Applications, 29–37 (May 1988).
Christopher Giertsen, Volume Visualization of Sparse Irregular Meshes, IEEE Computer Graphics & Applications, 40–48 (Mar. 1992).
James F. Blinn, Compositing, Part 1: Theory, IEEE Computer Graphics & Applications, 83–87 (Sep. 1994).
James F. Blinn, Compositing, Part 2: Practice, IEEE Computer Graphics & Applications, 78–82 (Nov. 1994).
Brian Cabral, et al., Accelerated Volume Rendering and Tomographic Reconstruction Using Texture Mapping Hardware, Silicon Graphics Computer Systems, 91–98 (1995).
Kartik Venkataraman, et al., Piece–Wise Linear Morphing and Rendering with 3D Textures, Computer Networks and ISDN Systems 29, 1625–1633 (1997).

* cited by examiner

Primary Examiner—Phu K. Nguyen
(74) Attorney, Agent, or Firm—Trop, Pruner & Hu, P.C.

(57) ABSTRACT

A method for use with a computer system includes assembling a group of volume units to represent at least a portion of a three-dimensional (3-D) object and compressing each volume unit onto a pixel plane to form an associated indication of the volume unit. The indications are used to form a first image of a view of the portion(s) of the 3-D object on a display of the computer system. The view of some of the volume units are changed leaving the view of the remaining volume units unchanged. The indications that are associated with the remaining volume units are used to form a second image of the portion(s) of the 3-D object on the display.

30 Claims, 9 Drawing Sheets

VOLUME RENDERING

BACKGROUND

The invention relates to volume rendering.

For purposes of rendering an image of a volume for display on a computer, the volume may be represented by a finite number of points, and each of these points may be associated with a scalar or a vector value (a time varying value, for example) that represents a density of the volume at that point. In the case where sampling is used to obtain the values, the points that represent the computer-rendered volume may not be aligned with the actual points at which the samples were taken. Instead, each point of the computer-rendered volume may be a point of a uniform grid, and the value that is associated with the point may be obtained via trilinear interpolation of data that is sampled near the corresponding point of the actual volume. Procedures other than sampling may be used to derive the values, such as a procedure that uses one or more polynomial functions.

In general, volume rendering creates a view of the volume from a particular point of view (or two, for stereo display), while allowing image manipulations, such as false color and transparency manipulations. For certain three-dimensional (3-D) graphics applications (medical and geological applications, as examples), it may be desirable for displays of scalar or vector density volumes to be updated at rates fast enough to support real time interaction. This interaction may include traditional activities, such as rotation, cutting or clipping. However, the interaction may also include subtler interactions, such as volumetric deformations and morphing transformations to adjust and design shapes or to simulate tissue motion in surgery, as examples.

As an example, if a graphics application simulates surgery, a controller may be used to move a displayed scalpel. In this manner, the displayed scalpel must respond quickly in response to movement of the controller to prevent overshoot of the displayed scalpel. As an example, the difference in time from when the controller moves to when the scalpel moves in response may need to be less than approximately 100 milliseconds.

Current volume rendering schemes may use a central processing unit-based (CPU-based) approach in which a CPU executes software to perform the volume rendering. However, CPU-based processing may be too slow to support desired interaction rates. For example, some current volume rendering schemes may use a technique called "ray casting" to form an image of a volume. With ray casting, the appearance of an opaque or translucent 3-D object is determined by tracing a ray from a viewpoint of the image to (and if necessary through) the object or from behind the object to the viewpoint. However, traditional approaches to ray casting may be slowed primarily by the nature of their memory accesses to volume elements (called 'voxels'), accesses that may nullify the performance benefits that are otherwise gained by a cache. This inefficient use of the cache may be improved by processing small rectangular blocks, or sub-blocks, of the volume at a time, but rectangular block organization may be an obstacle to fast morphing transformations.

Other volume rendering schemes may include techniques called splatting, 3-D texture mapping and shear-warp factorization. However, none of the above-described schemes may be fast enough to support morphing and/or display of the volume at desired interaction rates without relying on specialized graphics hardware and/or a substantial amount of pre-processing.

Thus, there is a continuing need for an arrangement that addresses one or more of the problems stated above.

SUMMARY

In one embodiment, a method for use with a computer system includes assembling a group of volume units to represent at least a portion of a three-dimensional (3-D) object and compressing each volume unit onto a pixel plane to form an associated indication of the volume unit. The indications are used to form a first image of a view of the portion(s) of the 3-D object on a display of the computer system. The view of some of the volume units is changed, leaving the view of the remaining volume units unchanged. The indications that are associated with the remaining volume units are used to form a second image of the portion(s) of the 3-D object on the display.

DETAILED DESCRIPTION

Figure 1:
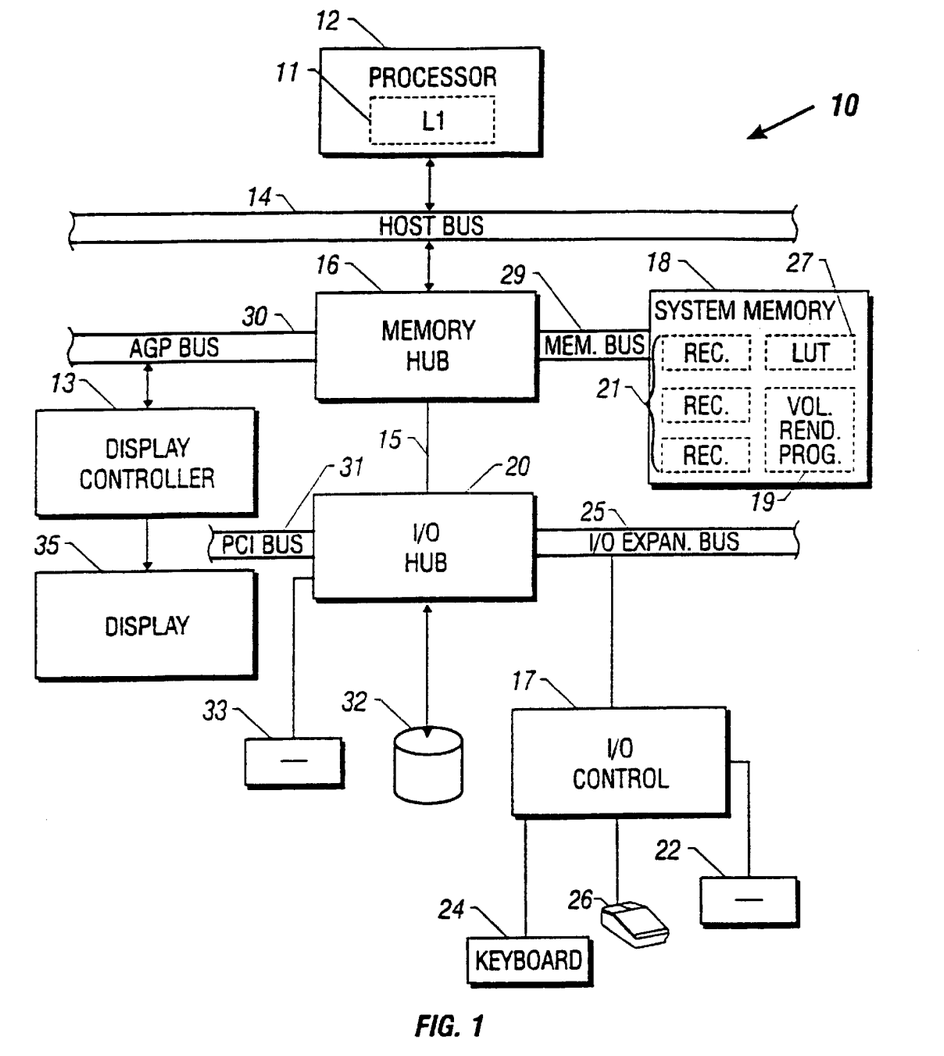
FIG. 1 is a schematic diagram of a computer system according to an embodiment of the invention.

Referring to FIG. 1, an embodiment 10 of a computer system in accordance with the invention may include a processor 12 that executes a volume rendering program 19 that is stored in a system memory 18. When executed by the processor 12, the program 19 causes the processor 12 to, via a display 35 (of the computer system 10), display successive snapshots, or frames, of a three-dimensional (3-D) scene. As described below, for purposes of rendering a particular frame, the processor 12 may use information derived from previously rendered frames and thus, minimize the number of image processing operations. As a result of this technique, in some embodiments, the computer system 10 may support desired graphics interaction rates without relying on specialized graphics hardware or relying on a substantial amount of pre-processing.

In some embodiments described below, the volume data is assumed to be in a grid-of-samples form, and interpolation may be used to derive or evaluate densities for points (e.g., arbitrary points for ray tracing, as described below) other than the sample points. However, in other embodiments, interpolation from the volume data may be replaced by any procedure for evaluating a density at arbitrary points.

Figure 2:
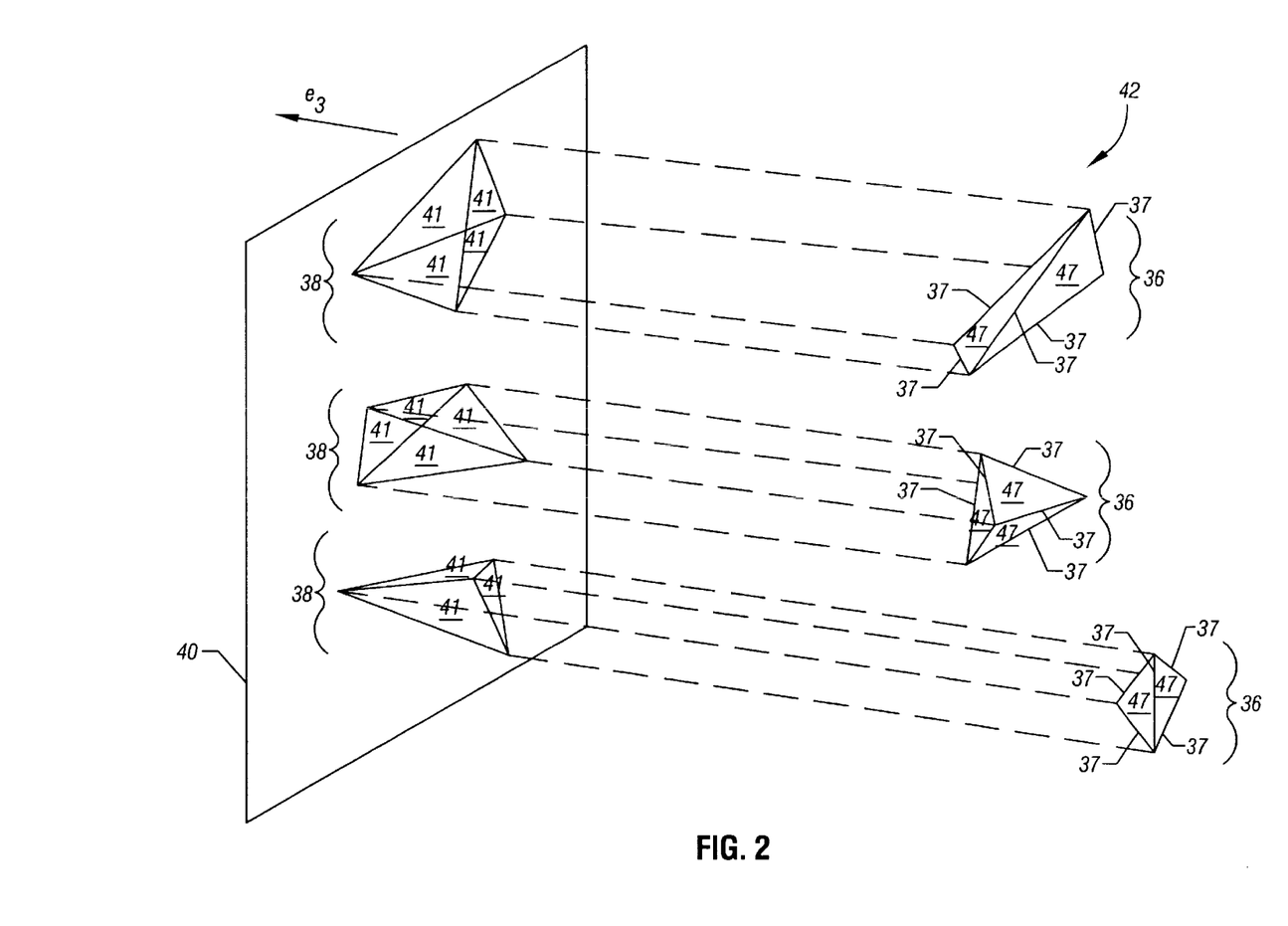
FIG. 2 is an illustration of the projection of faces of tetrahedra onto a pixel plane.

More particularly, referring to FIG. 2, a 3-D scene 42 may include 3-D objects that are processed by the processor 12 to render a two-dimensional (2-D) image on a pixel plane 40. In this manner, the pixel plane image may be displayed by the display 35 (see FIG. 1) to form one frame of the scene. Each of the 3-D objects may be represented by a mesh of one or more tetrahedra 36 that are associated with volume data (density or color values at a set of grid points, or "voxels"). The processor 12 may form the pixel plane image by compositing 2-D compressed images 38 of the tetrahedra that are generated by the processor 12, as described below. In this manner, each compressed image 38 is associated with one of the tetrahedra 36, and the processor 12 determines the pixel plane boundaries of the image 38 by projecting edges 37 of the tetrahedron onto the pixel plane 40. Using these boundaries, the processor 12 may then derive color and opacity values for each compressed image 38 via ray casting and blending techniques, described below. The color and opacity values for each compressed image 38, in turn, may be described by an associated record 21 (see FIG. 1) of data that the processor 12 uses when compositing the compressed images 38, as described below.

For purposes of compositing the compressed images 38 of a particular frame, the processor 12 may selectively generate records 21 for some of the tetrahedra 36 and reuse some of the previously generated records 21 for the other tetrahedra 36. In particular, in some embodiments, the processor 12 may reuse a record 21 that was generated to render a previous frame, as long as the associated tetrahedron 36 is not clipped, an object does not intervene with the tetrahedron 36, the angle of view of the tetrahedron 36 has not changed from the time when the record 21 was created, and the rendering specifications (for example, specifications that specify which voxel values are to be regarded as "transparent") are unchanged. Morphed volumes may be rendered simply by changing (on a per-tetrahedron basis) the matrices that control the relationship between the scene coordinates and the volume data coordinates of points in a tetrahedron, a change that does not increase rendering time, in some embodiments.

The processor 12 begins the compression of a particular tetrahedron 36 by projecting the four faces 47 of the tetrahedron 36 onto the pixel plane 40. The overlaps of these projections, in turn, result in the formation of either three or four triangles 41. In degenerate cases where the eye is aligned with a face or edge, some of the triangles 41 may coincide or become mere lines. However, these cases are ignored by the processor 12.

Figure 3:
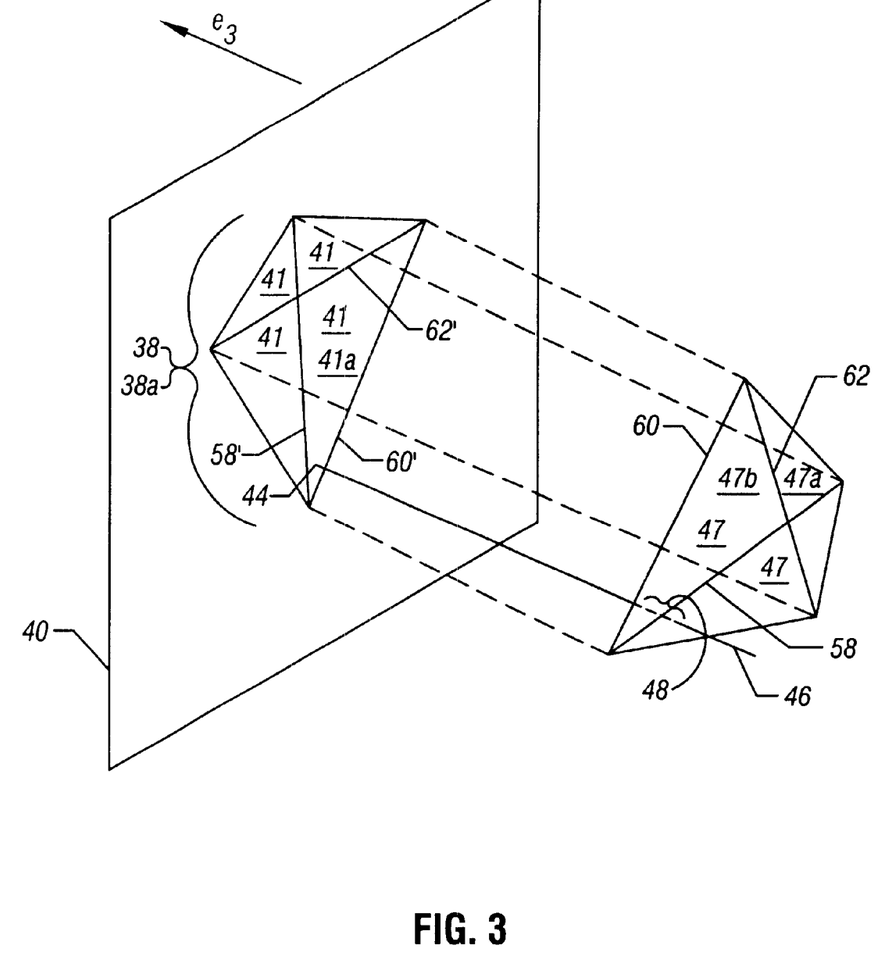
FIG. 3 is an illustration of the compression of a tetrahedron using ray casting and blending techniques.

Referring to FIG. 3, for each pixel 44 within each triangle 41, the processor 12 may use a ray casting technique in which the processor 12 casts a conceptual ray 46 through the pixel 44 and the associated tetrahedron 36. The processors 12 loads the voxel values for all points, each of whose voxel coordinates lies within one step of the voxel grid from a value that occurs in the tetrahedron. The set of such points forms a "bounding box" of the tetrahedron. Alternatively, in some embodiments, the processor 12 may use a shape-encoding scheme in which the processor 12 may load only the voxel values whose coordinates are each less than one grid step from those of a point within the tetrahedron. Using the ray 46, the processor 12 obtains the density values of selected points 48 that are bound by the tetrahedron 36 and extend along the ray 46. The processor 12 blends (as described below) $RGB_\alpha$ values that are associated with the points 48 to derive an $RGB_\alpha$ value for the pixel 44, as further described below. The "R" of the "$RGB_\alpha$" denotation represents a red color component of the pixel 44, the "G" represents a green color component of the pixel 44, the "B" represents a blue color component of the pixel 44, and the "$_\alpha$" represents an opacity for the combined color values of the pixel 44. In some embodiments, each component of color may have an associated opacity value, allowing, for example, associations of "opaque for red and clear for blue."

Figure 15:
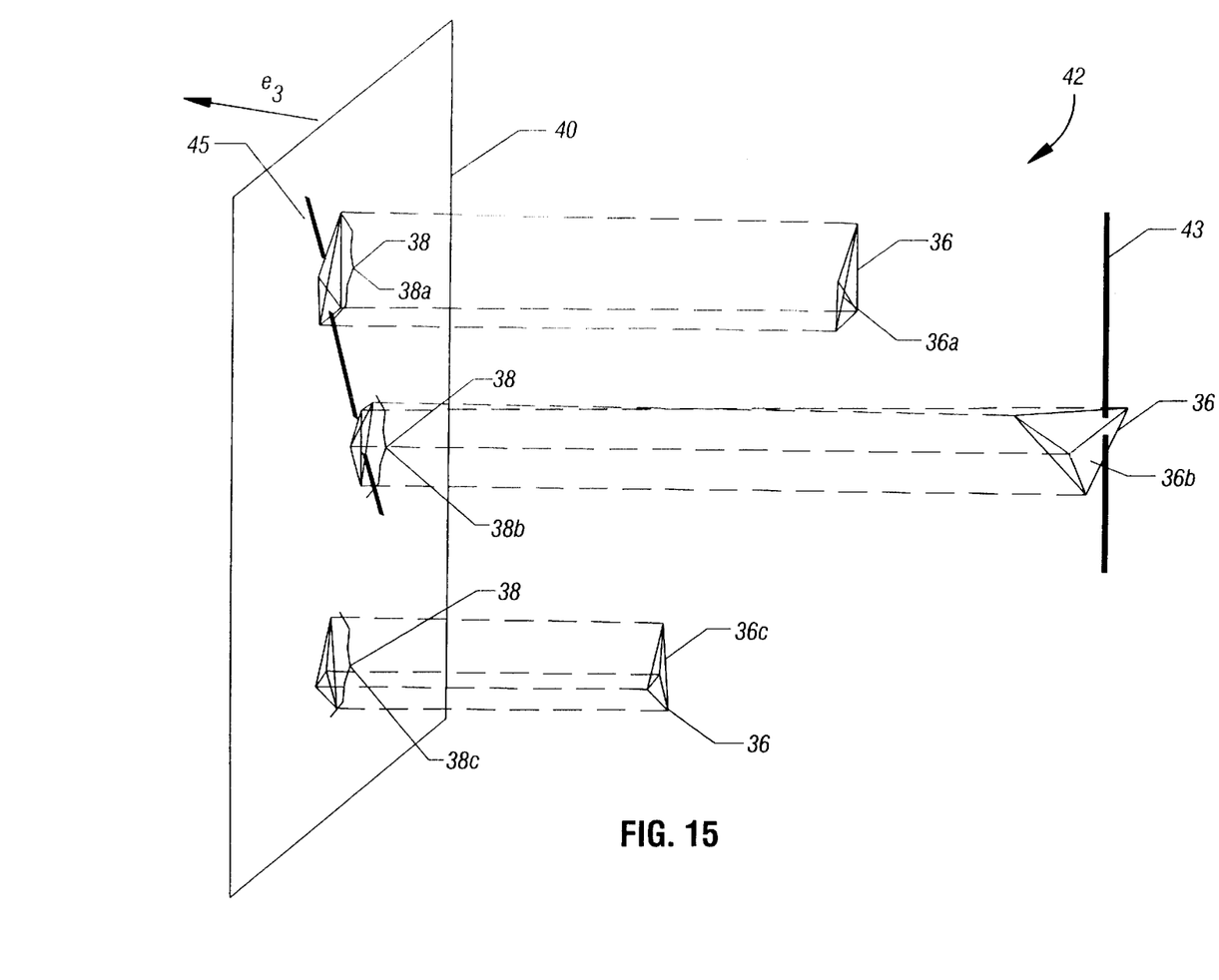
FIG. 15 is an illustrations of a 3-D scene after an additional object is introduced to the scene.

Thus, the record 21 may indicate a set of $RGB_\alpha$ values for each compressed tetrahedron 36. After the processor 12 generates a particular record 21, the processor 12 may reuse the record 21 to render subsequent images of a scene, as long as the associated tetrahedron 36 is not clipped, the angle of view and the transfer function used for the tetrahedron 36 do not change and no object is introduced that obscures the view within the tetrahedron 36. When the tetrahedron 36 is intersected by an object that hides part of the tetrahedron 36 but does not intersect the tetrahedron 36, then the associated record 21 may be reused. For example, referring to FIG. 15, an object 43 (a scalpel, for example) may be introduced into a scene 42, and the object 43 may intersect one or more tetrahedra 36b of the scene 42 but not intersect other tetrahedra (tetrahedra 36a and 36c, as examples) of the scene 42. Thus, because of the intervention of the object 43, the processor 12 may recompress the tetrahedron 36b again, an event that may involve subdividing the tetrahedron 36 into smaller tetrahedra. However, because the object 43 does not intersect the tetrahedra 36a and 36c, the processor 12 may use their associated stored records 21.

Referring back to FIG. 3, the processor 12 may address voxels to derive the density of the selected points 48 along the ray 46, and once the processor 12 compresses a particular tetrahedron 36 to obtain the corresponding $RGB_\alpha$ values, the voxels of the tetrahedron 36 are not addressed again in rendering the current frame. As a result, the spatial locality of memory accesses is increased, a condition that improves cache performance. In this manner, in some embodiments, each tetrahedron 36 may be sized to ensure that its bounding box includes few enough voxels so that the associated data fits into a level one (L1) cache 11 (see FIG. 1) of the processor 12 or other caches of the processor 12 or the computer system 10. For example, in some embodiments, the data that is associated with bounding box voxels may be loaded into an L1 cache, and the data for voxels for a particular ray may be selectively prefetched from the cache. Due to this technique, the speed of the volume rendering may be independent of the size of the entire data set.

Thus, the advantages of the invention may include one or more of the following: specialized hardware may not be required; CPU processing may be used to achieve desired interactive rates; images of scalar or vector density volumes may be viewed in real time; generic personal computers may be used; caches may be efficiently utilized; large pre-processing times may not be required; real-time interaction with an image, including morphing, may occur; and multi-threading and thus, multiple CPUs may be used.

Figure 4:
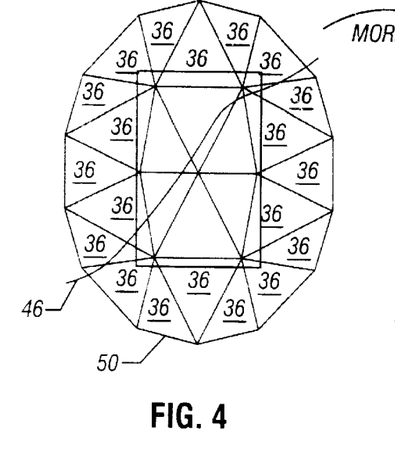
FIG. 4 is an illustration of a mesh of triangles (two-dimensional analogues of tetrahedra) before a morphing transformation.
Figure 5:
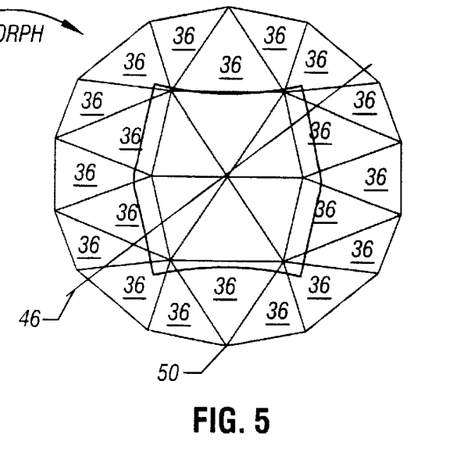
FIG. 5 is an illustration of the mesh of FIG. 4 after the morphing transformation.
Figure 6:
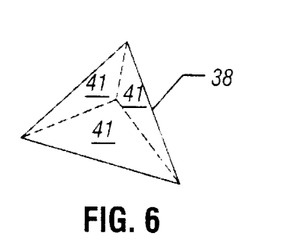
FIGS. 6, 7, 8, 9, 10 and 11 are illustrations of possible triangles formed from the projection of faces of a tetrahedron onto a pixel plane.

Referring to FIG. 4, the above-described technique takes advantage of the observance that a path along which the ray 46 travels through a 3-D mesh 50 of tetrahedra 36 may be approximated by a straight line across each of the tetrahedra 36. This local linearity is present even if, for example, a morphing transform is applied to transform the original mesh 50 into another mesh 50' of tetrahedra 36', as depicted in FIG. 5. Thus, the path in which a ray 46' travels through the mesh 50' may also be approximated by linear segments through each of the tetrahedra 36'. Therefore, the local linearity provided by the tetrahedral representation permits the selected points 48 (see FIG. 3) of a particular tetrahedron 36 to be referenced back to the original data, regardless of the global distortion. The processor 12 may compress each tetrahedron 36 independently from the other tetrahedra 36 of the scene 42, as there is no tracking of rays from one tetrahedron 36 to another.

Figure 7:
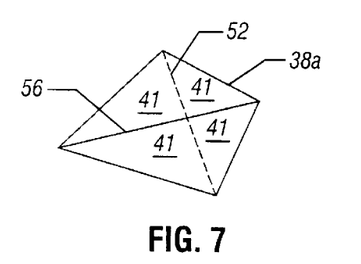
Figure 8:
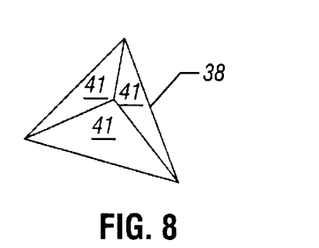
Figure 9:
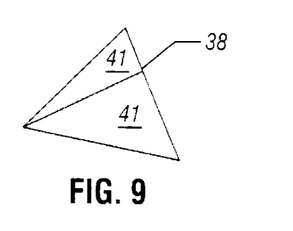
Figure 10:
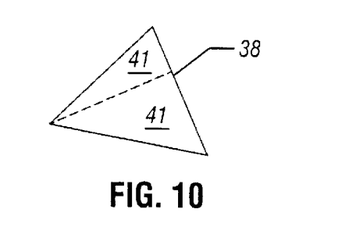
Figure 11:
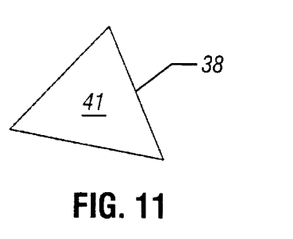

Referring back to FIG. 3, as noted above, to compress a particular tetrahedron 36, the processor 12 projects the four faces 47 of the tetrahedron 36 onto the pixel plane 40 to form the overlap-of-projection triangles 41. There are six possible orientations of a particular tetrahedron 36 with respect to the pixel plane 40, and these orientations may produce the six triangle 41 orientations that are illustrated in FIGS. 6, 7, 8, 9, 10 and 11. The dotted line(s) represent edge(s) (if any) of the tetrahedron 36 that are hidden from the pixel plane 40. However, these dotted lines, like their solid line counterparts, form edges of the triangles 41, as a hidden edge of a tetrahedron 36 defines a boundary for the selection of the points 48. For example, the tetrahedron 36 that is depicted in FIG. 3 may be compressed to form a compressed image 38a. In this manner, three edges 58, 60 and 62 of the tetrahedron 36 project to lines 58', 60' and 62' that truncate to form the edges of a triangle 41a. In this example, the resultant compressed image 38a has the general orientation that is depicted in FIG. 7. For a tetrahedron 36 in one of the orientations depicted in FIGS. 6, 8, 9, 10 and 11, one face 47 projects to define the entire outline of the compressed image 38 and serves as either a near plane common to all three triangles 41, or a far plane common to all three triangles 41.

Figure 12:
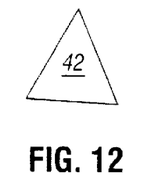
FIG. 12 is an illustration of a triangle formed by merging the triangles of FIG. 6, 8, 9, 10 or 11 together.
Figure 13:
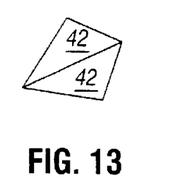
FIGS. 13 and 14 are illustrations of triangles formed by merging the triangles of FIG. 7 together.
Figure 14:
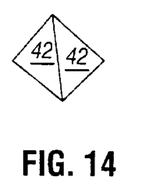

The one to four triangles 41 in FIGS. 6, 7, 8, 9, 10 and 11 may be merged, either before or after compression, into one or two triangles 42 that are depicted in FIGS. 12, 13 and 14. In this manner, the triangles 41 of FIGS. 6, 8, 9, 10 and 11 may be merged together to produce the triangle 42 that is depicted in FIG. 12; and the triangles of FIG. 7 may be merged together to produce the triangles 42 that have one of the two orientations that are depicted in FIGS. 13 and 14. Within one triangle 41, every pixel has an associated ray which meets the same far and near planes as the other rays through pixels in that triangle. Therefore, in some embodiments, if compression is done before merging, the parameters defining both planes may be set outside of a software loop that is used in conjunction with ray tracing (described below) as all pixels inside the triangles 41 are associated with the same far and near planes. However, in some embodiments, the merging is done before compression, the overhead in scanning over pixels is reduced by the use of the fewer triangles 42, but within the loop, test are performed to planes associated with particular groups of pixels inside the triangles 42. The relative cost of the particular technique may depend on the computer architecture that is used. In embodiments, where merging occurs, either before or after compression, the associated record 21 indicates one or two triangular bitmaps, and each bitmap may be organized as a simple run-length format as sets of pixels.

Referring back to FIG. 3, for each triangle 41 the processor 12 casts rays 46 through the pixels 44 that are bound by that triangle 41 to compress part of the tetrahedron 36. For a particular triangle 41, each ray 46 travels along a path that intersects the same near face 47a of the tetrahedron 36 when entering the tetrahedron 36 and intersects the same far face 47b of the tetrahedron 36 when exiting the tetrahedron 36. Thus, because each triangle 41 is associated with a far face 47b and a near face 47a of the tetrahedron 36, the processor 12 may use the associated tetrahedral faces 47a and 47b as bounding planes to guide the selection of the points 48, in all rays through pixels bounded by that triangle 41.

In some embodiments, the processor 12 may project more than one ray through a particular pixel 44 of the display to determine more than one associated $RGB_\alpha$ value for the pixel 44. For example, in some embodiments, the processor 12 may project two rays through each pixel 44: one ray that extends through a left eye viewpoint and one ray that extends through a right eye viewpoint. For these embodiments, the processor 12 places the $RGB_\alpha$ value derived from each view into a left or right compressed image 38, which will be blended into a left or right pixel plane buffer to obtain the final left or right $RGB_\alpha$ value for the pixel 44.

Before or after the processor 12 compresses the tetrahedra 36 (if any) for the current frame, the processor 12 may order the tetrahedra 36, a procedure that uses position data of their vertices, not the associated volume data. Once the volume data associated with a tetrahedron 36 is processed, the volume data associated with that tetrahedron 36 is not used again in rendering the same frame. The processor 12 orders the tetrahedra 36 in back-to-front or front-to-back order to define an ordering for the compositing operations of the associated compressed images 38 that follow. In some embodiments, a depth-first back-to-front sort is used, and unless the 'which obscures which' graph contains cycles, the depth-first back-to-front sort ensures that if any point of tetrahedron A is between the viewer's eye and any point of tetrahedron B, tetrahedron B is blended into the image first.

Thus, after the ordering, the processor 12 may composite the compressed images 38 together in accordance with the ordering. As an example, in some embodiments, the processor 12 may use a Z-buffer technique to perform the compositing.

Compositing order is in general independent of the order in which tetrahedra are compressed, though in an appropriate architecture it may be convenient to pipeline the dataflow so that some compressed tetrahedra may be composited while others are still being compressed. In some embodiments, compression may be handled by a "compression engine" (a software compression engine or a hardware compression engine, as examples) that creates new compressed bitmaps when called upon by a manager program that tracks the need for updates and sends bitmaps for compositing.

In some embodiments, the volume-rendering program 19 may cause the processor 12 to use parallel projection to render the image on the pixel plane 40. However, in other embodiments, perspective projection may be used. As an example, the equations for the parallel projections are described below.

In particular, the volume data typically enter the system as an L×M×N grid of raw volume coordinates called $(\rho_1, \rho_2, \rho_3, 1)$. A point in this coordinate system corresponds to an exact data point if and only if its three coordinates are integers, with $0=\rho_1<L$, $0=\rho_2<M$ and $0=\rho_3<N$. However, the point does have a meaning for non-integer values, since data values may be interpolated there from those at exact data points.

The raw volume coordinates may be transformed into volume object coordinates called $(v_1, v_2, v_3, 1)$. The object transformation (called A) from the raw volume coordinates to the volume object coordinates may, as an example, scale the data from coordinates that treat the data as an integer-coordinate grid to (for example) centimeter units in the brain from which the data came. This scaling may involve different scales within slices and across the slices. Either linear or non-linear transformations (as examples) may be used to compensate for distortion in data collection or for a general morphing transformation. Within a particular tetrahedron t, a nonlinear A object transformation may be approximated by the affine map $A_t$ that gives $$A_t(v)=A(v) \quad (1)$$

for each vertex v of t. The 4×4 matrix of $A_t$ may be called the morphmatrix of t.

The volume object coordinates, in turn, may be transformed into world coordinates called ($w_1$, $w_2$, $w_3$, 1). A position transformation (called P) from the object coordinates to the world coordinates is what controls the position of the 3-D object, relative to the origin and axes defined for the world inside the display.

The homogeneous world coordinates may be transformed into homogeneous eye coordinates ($e_1$, $e_2$, $e_3$, 1), in which the eye is at (0, 0, 0, 1) and is looking along the negative $e_3$-axis (see FIG. 3) that is usually labeled as being the z-axis. An eye transformation (called E) relabels points from display-world coordinates to eye coordinates.

Finally, there are homogeneous 4-tuple perspective coordinates ($p_1$, $p_2$, $p_3$, w), reduced by division by w to normalized device coordinates, as described below:

$$(v_1, v_2, v_3) = \left(\frac{p_1}{w}, \frac{p_2}{w}, \frac{p_3}{w}\right). \quad (2)$$

A projection transformation F converts the eye-coordinates into perspective coordinates.

Up to the final division by w, a point ρ in raw volume data space, lying in a tetrahedron t, is transformed in the piecewise linear approach to perspective coordinates as described below:

$$\rho \to F(E(P(A_t(\rho)))) = (FEPA_t)\rho, \quad (3)$$

where the product matrix $FEPA_t$ is fixed for all points in the tetrahedron 36, in a given rendering, and if A is linear, the FEPA matrix is the same for all tetrahedra. The whole product $$V_t = FEPA_t \quad (4)$$

maybe labeled a tetraview matrix for the tetrahedron t, the constant product $$O = FEP \quad (5)$$

may be labeled a volumeview matrix, and the product $$T = EP$$

may be labeled a modelview matrix.

Unlike the case of rendering polygons, where polygons defined in object coordinates are transformed for drawing into normalized device coordinates, in volume rendering, the points are selected along the ray through the eye position to find the corresponding values in raw volume space.

In various contexts, the processor 12 may need to compute the inverses $T^{-1}$ of the modelview matrix and $$V_t^{-1} = A_t^{-1}O^{-1} \quad (6)$$

of the tetraview matrix. The processor 12 may determine the constant factors $O^{-1}$ and $T^{-1}$ once per rendering. The tetrahedron-dependent factor inverse of the morphmatrix ($A_t^{-1}$) is constant throughout any sequence of renderings that change only the position and not the morph, such as a rotating view, for example. As a result, the processor 12 may compute $A_t^{-1}$ at setup and revise $A_t^{-1}$ only when a morphing transformation is changed.

In the case of parallel projection, the projection matrix can be replaced by simple scaling to bring the window sides to the square (±1, ±1) and the third coordinate at the far and near clipping planes to +1 and −1, respectively. Therefore, by dropping the fourth coordinate, the processor 12 may use normalized device coordinates ($v_1^i$, $v_2^i$, $v_3^i$).

For ray casting, the calculations performed by the processor 12 may be described by the following calculations. In particular, a tetrahedron t has vertex positions $v^i = (v_1^i, v_2^i, v_3^i)$ for i=0,1,2,3 in normalized device coordinates. In the following description, the 4×4 matrix $V_t^{-1}$ is denoted by M and carries points ($p_1$, $p_2$, $p_3$, 1) in perspective coordinates to points ($\rho_1$, $\rho_2$, $\rho_3$, 1) in raw volume coordinates, with vertices matched for the current tetrahedron 36.

If the pixel plane is identified with the plane ($\upsilon_3$=0, w=1) of perspective coordinates, then a correspondence is established between the pixel indices and the coordinates ($\upsilon_1$, $\upsilon_2$, 0). If the window is 2M pixels wide and 2N pixels high, then the following parameters may be introduced:

$$\delta_1 = \frac{1.0}{M} \quad \delta_2 = \frac{1.0}{N}. \quad (7)$$

In this manner, for integers −M=m<M and −N=n<N, the pixel position $$(0,0,0,1) + m(\delta_1, 0, 0, 0) + n(0, \delta_2, 0, 0)$$

is carried by M to the point $$(\rho_1^{m,n}, \rho_2^{m,n}, \rho_3^{m,n}, 1) = M((0, 0, 0, 1) + m(\delta_1, 0, 0, 0) + n(0, \delta_2, 0, 0)) \quad (8)$$

$$= M(0, 0, 0, 1) + mM(\delta_1, 0, 0, 0) + nM(0, \delta_2, 0, 0)$$

$$= \vec{w} + m\hat{\delta}_1 + n\hat{\delta}_2$$

in raw volume coordinates, where $\vec{w}$, $\hat{\delta}_1$ and $\hat{\delta}_2$ are 4×1 matrices (vectors).

Likewise, each step forward along a ray in the $v_3$ direction gives a step $\hat{\tau}$ in the space of raw volume coordinates ($\rho_1$, $\rho_2$, $\rho_3$, 1).

In some embodiments, for each pixel plane triangle, the processor 12 may use standard scan-line rendering techniques to identify those pixels that lie within the triangle 41. For each pixel ($m\delta_1$, $n\delta_2$) thus identified as being inside the triangle, the processor 12 then computes the raw coordinates in (u, w) space using the matrix M described above.

When stereo pictures (left eye and right eye views) are being rendered, there is a distinct matrix M for each view. When only one view is being rendered, it is identified (for convenience of language) as the right eye view.

For an individual ray and its screen point ($\delta_1^{m,n}$, $\delta_2^{m,n}$, $\delta_3^{m,n}$, 1) found this way, the processor 12, in some embodiments, may select the points 48 such that the points 48 are evenly spaced apart in ($v_1$, $v_2$, $v_3$) space and lie between the near and far tetrahedral faces. In some embodiments, at each point 48, the processor 12 determines the density value of that point through trilinear interpolation. In this manner, the processor 12 may determine the density values of the eight nearest voxels, and interpolate between these density values to derive a density value for the point 48. The processor 12 may then use this density value as an index to an entry of a look-up table (stored in the memory 18), and the entry, in turn, may indicate an associated $RGB_\alpha$ value. Alternatively, a more general transfer function, yielding an associated $RGB_\alpha$ value for each possible density value, may be implemented in any standard way of computing a function, such as a piecewise linear or polynomial formula, which may also depend on the coordinates of the point. The processor 12 may determine the $RGB_\alpha$ values of the other points 48 doing the ray 46 in a similar manner and may blend the $RGB_\alpha$ values together (using an associative blending function, for example) to generate the $RGB_\alpha$ value for the pixel 44 through which the ray 46 extends.

Figure 16:
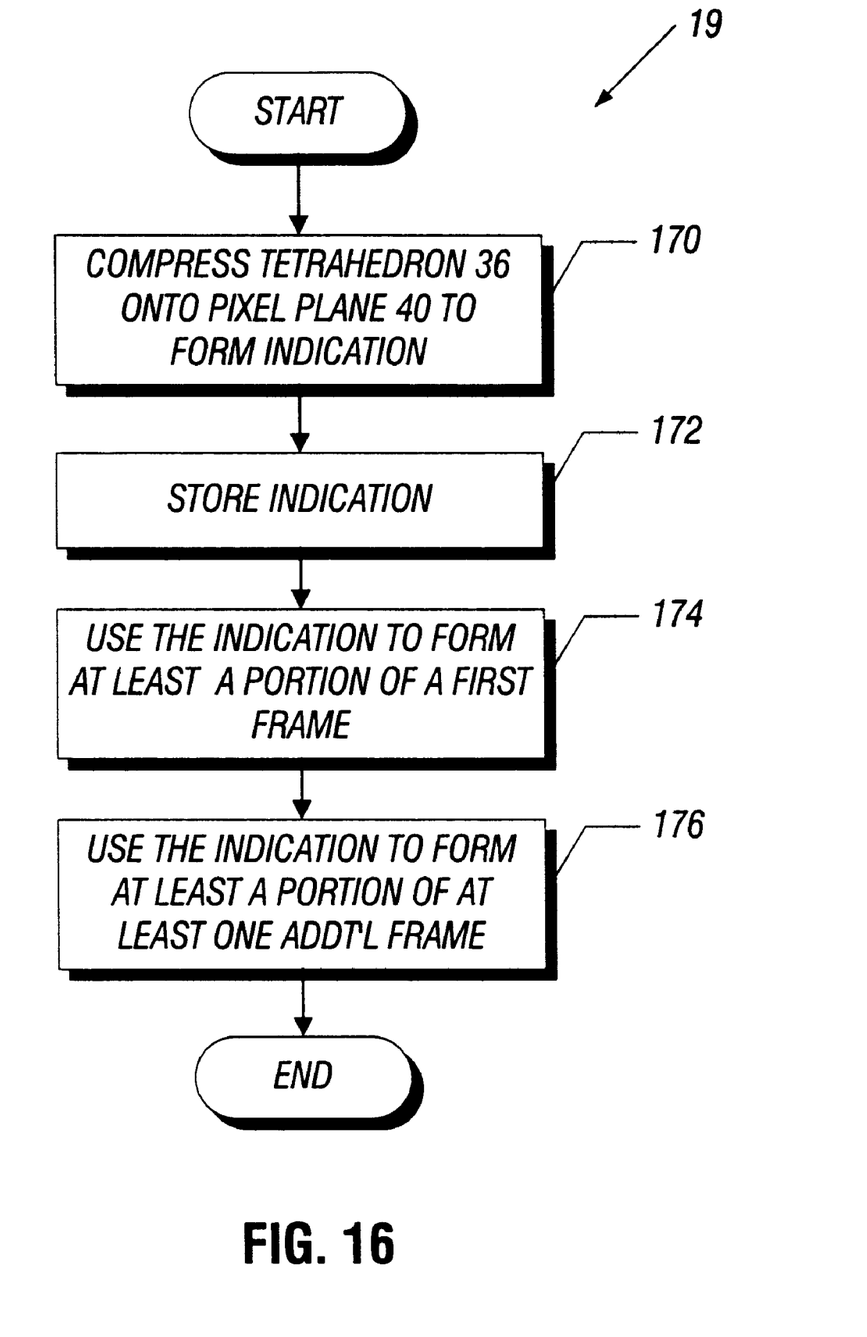
FIG. 16 is a flow diagram illustrating the execution of a tetrahedron compression program by a processor of the computer system of FIG. 1 according to an embodiment of the invention.

Referring to FIG. 16, to summarize, the volume rendering program 19, when executed by the processor 12, may cause the processor 12 to compress (block 170) a particular tetrahedron 36 onto the pixel plane 40 to form a compressed image 36 and thus, form an indication of the tetrahedron, i.e., form the associated record 21. Next, the program 19 may cause the processor 12 to store (block 172) the indication and use (block 174) the indication to form at least a portion of a first frame. For additional frames, the program 19 may cause the processor 12 to use (block 176) the indication to form at least a portion of at least one of the additional frames.

Figure 17:
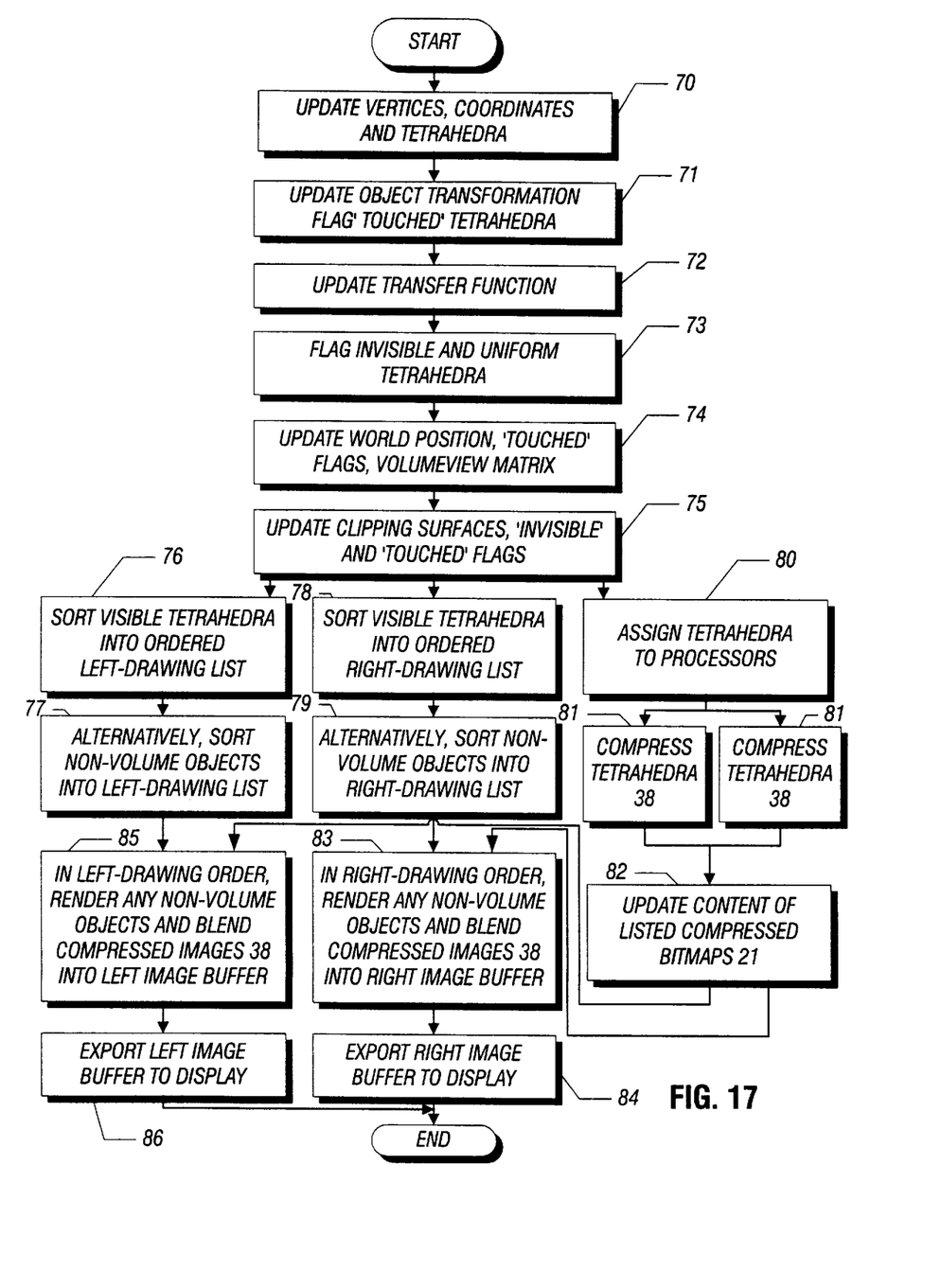
FIGS. 17, 18 and 19 are more detailed flow diagrams illustrating the execution of the tetrahedron compression program by the processor according to an embodiment of the invention.

Referring to FIG. 17, more particularly, the volume rendering program 19, when executed by the processor 12, may cause the processor 12 to update (block 70) a list of vertices (that describe the tetrahedra 36), update positions of vertices in raw volume coordinates, and update the list of tetrahedra 36. If the processor 12 is rendering the first frame in the process of viewing a volume, the non-updated lists may be empty, and/or if editing has occurred, the lists may have changed. Next, the processor 12 may update (block 71) the object transformation A. In this manner, the processor 12 may identify the vertices for which the value of A has changed and may flag (block 71) some of the tetrahedra 36 that use some of these vertices as 'touched'. The term "touched" generally describes a tetrahedron 36 that needs to be recompressed. For example, a particular tetrahedron 36 may be intersected by an object and as a result, is considered "touched."

Next, the processor 12 may update (block 72) the overall transfer function by updating a look-up table, for example. If the transfer function has changed, then some of the tetrahedra 38 may be invisible, and as a result, the processor 12 may test tetrahedra 36 to determine which voxels are all invisible ($\alpha=0$) to determine which tetrahedra 36 may be ignored. In response to the change in the overall transfer function, the processor 12 may also determine which voxels have the same $RGB_\alpha$ value, in which case the voxels may be rendered without sampling individual points. In response to determining which tetrahedra 38 are invisible and which tetrahedra are uniform, the processor 12 flags (block 73) these tetrahedra 36 as being "touched," thereby indicating that these tetrahedra 36 are to be re-compressed.

Subsequently, the processor 12 update (block 74) the world position of the volume. If this position has changed, the processor then flags (block 74) all of the tetrahedra 36 as being touched. The processor 12 may also compute (block 74) the volumeview matrix. Subsequently, the processor updates (block 75) the set of clipping planes that may have been changed by user input. The processor 12 may also flag (block 75) the tetrahedra 36 that are located outside the clipping planes as invisible and flag (block 75) tetrahedra 36 that meet new clipping surfaces as also being touched.

In the following, the separate branches beginning with blocks 76, 78 and 80 may be executed in parallel by, for example, separate microprocessors, threads, or a combination of different microprocessors and different threads. Therefore, the term "processor" may refer to one or more microprocessors, microcontrollers, and/or central processing units (CPUs), as examples. In some embodiments, all parallel branches are all executed before control proceeds to the next nonparallel branch. For example, the blocks 76, 77, 78, 79, 80, 81 and 82 are executed before control proceeds to either block 85 or block 83.

In this manner, the processor 12, in some embodiments, may sort (block 76) the visible tetrahedra 36 into an ordered left drawing list and sort (block 78) the visible tetrahedra 36 into an ordered right drawing list. Alternatively, if other objects, such as polygons of a surface or compressed images from the rendering of another volume are present, the processor 12 may sort (blocks 77 and 79) these objects into the same list. The action the processor 12 performs in block 76, 77, 78 and 79 may occur in parallel with the compression (blocks 80 and 81) of the different tetrahedra 36. The compressed images for the left view pass are rendered (block 85) into a buffer, and similarly for the right view, the compressed images for the right view are rendered (block 83) into a buffer. In blocks 84 and 86, the processor 12 passes the buffered images to the display controller 13 (see FIG. 1) for display on a display 35, for example.

Figure 18:
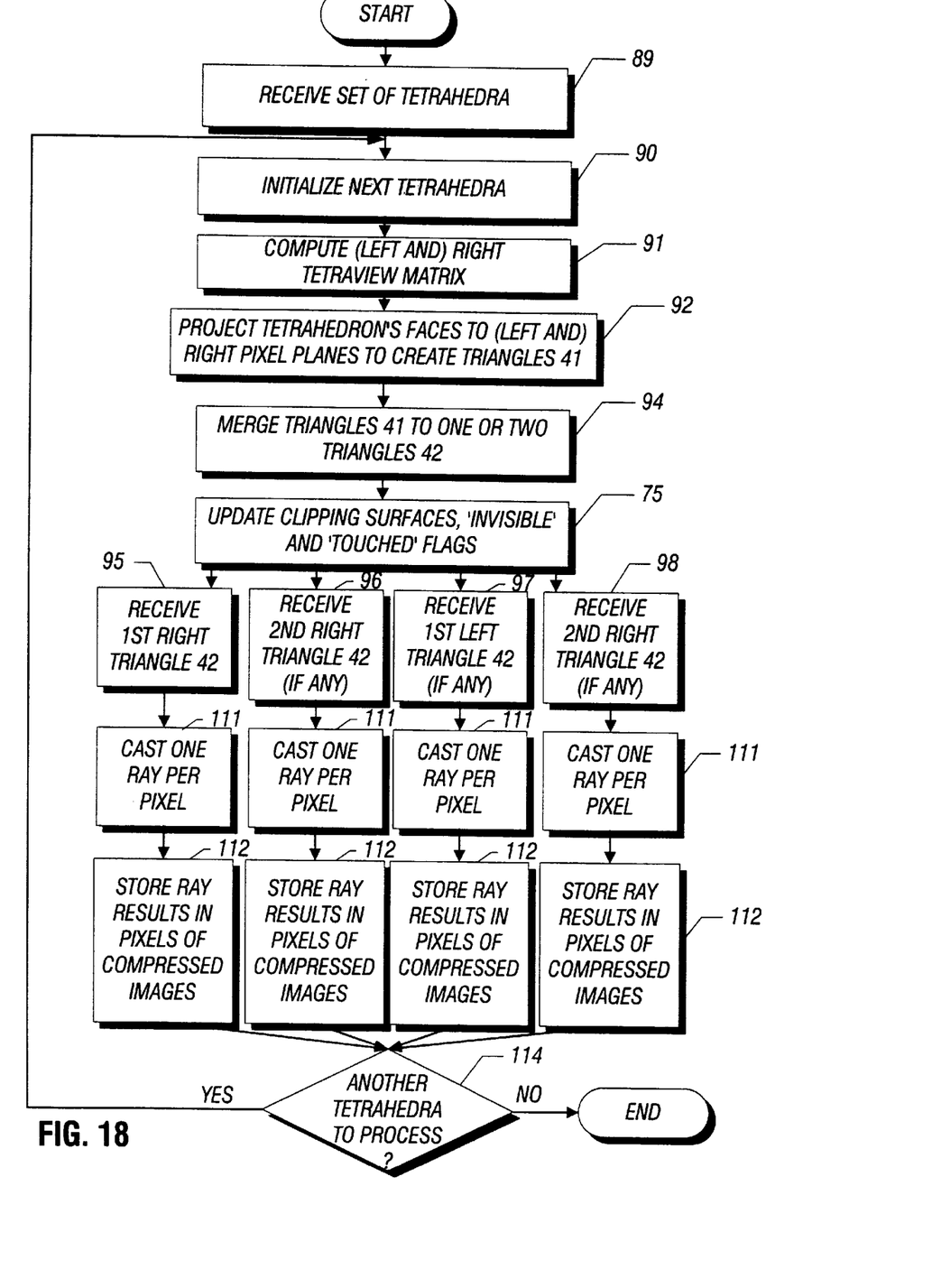

Referring to FIG. 18, to compress a particular tetrahedron 36, the processor receives (block 89) a set of assigned tetrahedra and sets up a loop to process each of them in turn. In this manner, in the loop body, the processor 12 initializes the next tetrahedron (block 90) and computes (block 91) the right and left tetraview matrices that are subsequently used by the processor 12 to project (block 92) the tetrahedron's faces 47 onto the pixel plane to create right and left triangles 41. The processor 12 subsequently merges (block 94) the triangles 41 into either one or two triangles 42. The processor 12 then passes indications of the triangle 42 to a particular microprocessor or thread. In this manner, in some embodiments, the processor 12 may allocate threads (indicated by blocks 95, 96, 97 and 98) to process the first and second (if needed) triangles 42 for the left and right views. For each triangle 42, the processor 12 casts (block 111) one ray per pixel, as further described below, and stores the indications of the pixels of the compressed image 38, as depicted in block 112 after storage (block 112). After these processes are complete, the processor 12 determines (diamond 114) if there is another tetrahedron 36 to process. If so, the processor 12 returns to block 90. Otherwise, the compression is complete.

Figure 19:
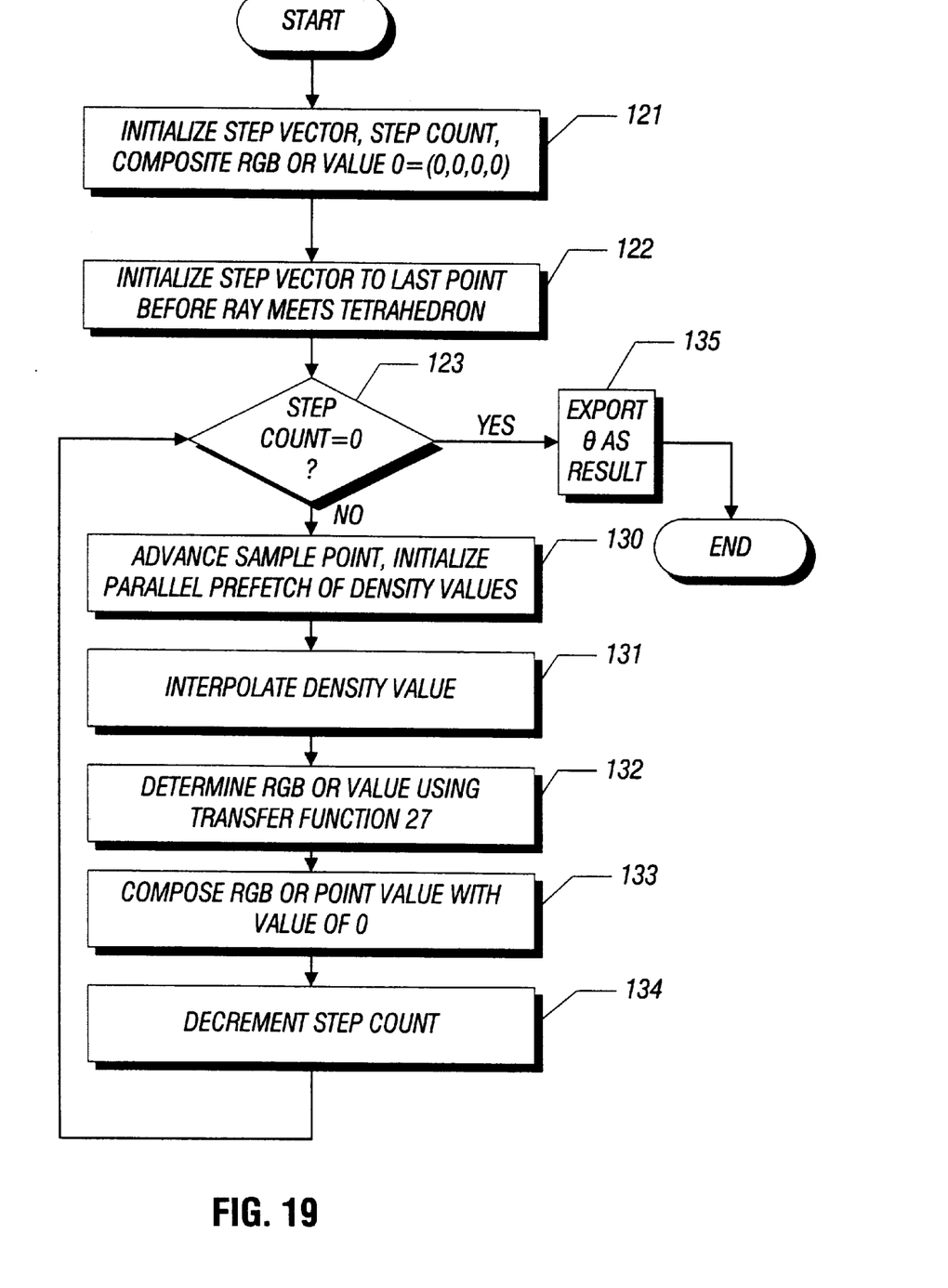

Referring to FIG. 19, to cast the rays and derive the pixels of the compressed images 38, the processor 12 may perform the following functions. In particular, the processor may initialize (block 121) the step vector that is used to select points on the ray, a count of steps that are needed, and the $RGB_\alpha$ value $\theta$ (initially zero for each color and transparency) value. The processor 12 subsequently initializes (block 122) the step vector to the last point before the ray enters the tetrahedron. Otherwise, if the point on the ray emerges before reaching the next step, the step count has to be reinitialized to zero.

The processor 12 next determines (diamond 123) whether the step count has become zero. If so, the processor exports (block 135) the current value of $\theta$. Otherwise, the processor 12 initializes (block 130) a prefetch of density values which may be done in parallel with processing of already-fetched values. The processor 12 may also advance (block 130) the current point that is being sampled along the ray by one step. From the current values obtained through the stepping, the processor 12 interpolates (block 131) the density value at the current point, transforms this interpolated value to an $RGB_\alpha$ value using the look-up table or other transfer functions (as indicated in block 132), composes (block 133) the interpolated $RGB_\alpha$ value with the value θ, and decrements (block 134) the step count by one. Control then returns to the diamond 123.

In the context of this application, the term "computer system" may refer to any type of processor-based system that may include a desktop computer, a laptop computer, an appliance, a graphics system, or a medical imaging system, as just a few examples. Thus, the invention is not intended to be limited to the illustrated computer system 10 but rather, the computer system 10 is an example of one of many embodiments of the invention.

Referring back to FIG. 1, in some embodiments, the computer system 10 may include a bridge, or memory hub 16. The processor 12 and the memory hub 16 may be coupled to a host bus 14. The memory hub 16 may provide interfaces to couple the host bus 14, a memory bus 29 and an Accelerated Graphics Port (AGP) bus 30 together. The AGP is described in detail in the Accelerated Graphics Port Interface Specification, Revision 1.0, published on Jul. 31, 1996, by Intel Corporation of Santa Clara, Calif. The system memory 18 may be coupled to the memory bus 29, and a graphics accelerator 13 may be coupled to the AGP bus 30. A hub communication link 15 may couple the memory hub 16 to another bridge circuit, or input/output (I/O) hub 20.

In some embodiments, the I/O hub 20 includes interfaces to an I/O expansion bus 25 and a Peripheral Component Interconnect (PCI) bus 31. The PCI Specification is available from The PCI Special Interest Group, Portland, Oreg. 97214. The I/O hub 20 may also include interfaces to a hard disk drive 32 and a CD-ROM drive 33, as examples. An I/O controller 17 may be coupled to the I/O expansion bus 25 and receive input data from a keyboard 24 and a mouse 26, as examples. The I/O controller 17 may also control operations of a floppy disk drive 22. Copies of the program 19 may be stored on, as examples, the hard disk drive 32, a diskette or a CD-ROM, as just a few examples.

Other embodiments in the scope of the following claims. For example, description of the objects may be stored in files on a mass storage device, and a manager program may retrieve the files to render the objects in a manner described above. Other arrangements are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for use with a computer system, comprising:
   assembling a group of volume units to represent at least a portion of a three-dimensional object;
   compressing each volume unit onto a pixel plane to form an associated indication of the volume unit;
   using the indications to form a first image of a view of said at least a portion of the three-dimensional object on a display of the computer system;
   changing the view of some of the volume units in the first image, leaving the view of the remaining volume units in the first image unchanged; and
   using the indications associated with the remaining volume units to form a second image of said at least a portion of the three-dimensional object on the display.

2. The method of claim 1, wherein the act of compressing comprises:
   compressing the volume units independently from each other.

3. The method of claim 1, wherein the act of compressing comprises:
   choosing first points inside the volume unit along a ray that extends through a pixel of the pixel plane, the first points being associated with first values; and
   using the first values to obtain a color value of the pixel.

4. The method of claim 3, further comprising:
   for each first point, determining associated second values for voxels near the first point; and
   deriving the associated first value for each first point by interpolating the second values.

5. The method of claim 3, further comprising:
   using the first values to obtain an opacity value of the pixel.

6. The method of claim 3, wherein the act of using the first values comprises:
   retrieving data from a look-up table.

7. The method of claim 3, wherein the act of using the first values comprises:
   retrieving data from a look-up table; and
   using a procedurally-specified transfer function.

8. The method of claim 3, wherein the act of using the first values comprises:
   retrieving data from a look-up table that may be selected by a process that depends on the spatial location of the first points.

9. The method of claim 3, wherein the act of using the first values comprises:
   using a procedurally-specified transfer function that may be selected by a process that depends on the spatial location of the first points.

10. The method of claim 3, further comprising:
    directing the ray to extend through a view point for the right eye.

11. The method of claim 3, further comprising:
    directing the ray to extend through a view point for the left eye.

12. The method of claim 3, wherein the act of using the first values comprises:
    blending the first values to obtain the color value.

13. The method of claim 1, wherein the volume units comprise:
    convex solid polyhedra.

14. The method of claim 1, wherein the act of changing the view comprises:
    touching said some of the volume units with another object.

15. The method of claim 1, wherein the act of changing comprises:
    changing a transform function that is used to obtain the view.

16. The method of claim 1, wherein the volume units comprise:
    tetrahedra.

17. An article comprising a storage medium storing instructions readable by a processor-based system to cause a processor to:
    provide a first indication of a tetrahedron that represents at least a portion of a first object of a scene,
    assemble a group of volume units to represent at least a portion of a three-dimensional object, compress each volume unit onto a pixel plane to form an associated indication of the volume unit, use the indications to form a first image of a view of said at least a portion of the three-dimensional object on a display of the system, change the view of some of the volume units of the first image, leaving the view of the remaining volume units of the first image unchanged, and use the indications associated with the remaining volume units to form a second image of said at least a portion of the three-dimensional object on the display.

18. The article of claim 17, comprising instructions to cause the processor to:

choose first points inside the tetrahedron along a ray that extends through a pixel of the pixel plane, the first points being associated with first values, and use the first values to obtain a color value of the pixel.

19. The article of claim 18, comprising instructions to cause the processor to:

use the first values to indicate densities.

20. The article of claim 18, comprising instructions to cause the processor to:

for each first point, determine associated second values for voxels near the first point, and derive the associated first value for each first point by interpolating the second values.

21. The article of claim 18, comprising instructions to cause the processor to:

use the first values to obtain an opacity value of the pixel.

22. The article of claim 18, comprising instructions to cause the processor to:

blend the first values to obtain the color value.

23. The article of claim 18, comprising instructions to cause the processor to:

immediately compress each volume unit from the other volume units to form an associated indication of the volume unit.

24. The article of claim 17, comprising instructions to cause the processor to:

choose different sets of first points inside the tetrahedron along rays that extend through associated pixels of the pixel plane, the first points being associated with first values, and use each set of first points to obtain a color value of the associated pixel.

25. A computer system comprising:

a display; and a processor coupled to the display and adapted to:

assemble a group of volume units to represent at least a portion of a three-dimensional object, compress each volume unit onto a pixel plane to form an associated indication of the volume unit, use the indications to form a first image of a view of said at least a portion of the three-dimensional object of a display of the system, change the view of some of the volume units of the first image, leaving the view of the remaining volume units of the first image unchanged, and use the indications associated with the remaining volume units to form a second image of said at least a portion of the three-dimensional object on the display.

26. The computer system of claim 25, wherein the processor is further adapted to:

select first points inside the tetrahedron for compression, the first points being located on a ray that extends through a pixel of the pixel plane and being associated with first values, and use the first values to obtain a color value of the pixel.

27. The computer system of claim 26, wherein the first values indicate densities.

28. The computer system of claim 26, wherein the processor is further adapted to:

for each first point, determine associated second values for voxels near the first point; and interpolate the second values to derive the associated first value.

29. The computer system of claim 26, wherein the memory stores a look-up table, and the processor is further adapted to retrieve data from a look-up table to obtain the color value based on the first values.

30. The computer system of claim 26, wherein the processor is further adapted to:

blend the first values to obtain the color value.

* * * * *